United States Patent [19]

Chabay

[11] Patent Number: 5,788,506
[45] Date of Patent: Aug. 4, 1998

[54] APPARATUS AND METHOD FOR DISPLAYING THE FLOW OF A SOLUTION IN RESPONSE TO THE MOVEMENT OF MAGNETIC PARTICLES

[75] Inventor: Ilan S. Chabay, Mountain View, Calif.

[73] Assignee: The New Curiosity Shop, Mountain View, Calif.

[21] Appl. No.: 738,959

[22] Filed: Oct. 24, 1996

[51] Int. Cl.[6] .............................. G09B 23/18; H01F 1/28; G01N 27/72

[52] U.S. Cl. .................... 434/301; 252/62.51 R; 324/215; 434/126

[58] Field of Search .................... 324/204, 214–216; 40/449; 273/239; 346/74.3; 434/301, 409, 126; 446/131; 252/62.51 R, 62.52–62.54

[56] References Cited

U.S. PATENT DOCUMENTS

| | | | |
|---|---|---|---|
| 3,443,214 | 5/1969 | Meservey | 324/214 |
| 3,663,731 | 5/1972 | Ofwerstrom | 434/301 |
| 4,064,453 | 12/1977 | Haas et al. | 324/214 |
| 4,804,327 | 2/1989 | Miller | 434/409 |
| 5,018,979 | 5/1991 | Gilano et al. | 434/409 |
| 5,411,398 | 5/1995 | Nakanishi et al. | 434/409 |

OTHER PUBLICATIONS

Dr. Ilan Chabay, "Magnetic Pole Patterns," The New Curiosity Shop, Educational Insights, 1992, pp. 1–8.
"Large Pole Patterns: Model No. 110," The New Curiosity Shop, Inc., 1992, Advertisement.
The New Curiosity Shop, "The New Curiosity Shop," 1990, Advertisement.

Primary Examiner—Gerard R. Strecker
Attorney, Agent, or Firm—Gray Cary Ware & Freidenrich

[57] ABSTRACT

An apparatus for displaying a pattern of a magnetic field is provided, comprising a container, a solution within said container having a plurality of magnetic particles, suspended within the solution, that align with a magnetic field in the vicinity of the container, the magnetic particles causing the solution to flow as the particles move into alignment with the magnetic field, and a plurality of flow indicator particles, suspended within the solution so that the flow of the solution in response to the movement of the magnetic particles is displayed. A method for displaying a pattern of a magnetic field and a mixture for use in an apparatus for displaying a pattern of a magnetic field are also disclosed.

18 Claims, 5 Drawing Sheets

APPARATUS AND METHOD FOR DISPLAYING THE FLOW OF A SOLUTION IN RESPONSE TO THE MOVEMENT OF MAGNETIC PARTICLES

BACKGROUND OF THE INVENTION

This invention relates generally to an apparatus and method for displaying patterns that characterize physical properties of an object, and in particular to an apparatus and method for displaying a pattern of a magnetic field and for displaying the flow of a solution in response to the movement of magnetic particles in a magnetic field.

Certain everyday physical properties of an object or our environment, such as radio waves, electric fields or magnetic fields, are invisible forces that affect our lives. A person may not actually feel that effect of these physical properties. However, these physical properties sometimes do have a profound effect on our lives. For example, radio waves permit people to communicate with each other. It is desirable for a person to be educated about these physical properties so that the person understands the limitations and dangers of these physical properties. In addition, a person may be educated about the beauty of patterns created by these physical properties, about the science behind these physical properties, and may be encouraged to be more creative. In order for a person to understand these physical properties, it is desirable for the person to be able to view the effects of these physical properties because people are usually more able to understand things that can be seen. For a magnetic field, for example, it is desirable that the person is able to view patterns of magnetic fields generated by an object and the ways in which the magnetic fields are formed.

A conventional apparatus for viewing the pattern of a magnetic field uses magnetic particles, such as iron filings, suspended within a solution that is contained within a large container. A person then uses magnets to affect the iron filings. These apparatus are typically used by museums as interactive hands-on exhibits that a number of people can use. These large exhibits, however, are expensive and are not portable. These apparatus show the static magnetic field pattern created by a magnetic object. However, the flow of the solution in response to the magnetic field, which is caused by the movement of the magnetic particles and illustrates the dynamic changes in the magnetic field in response to different stimulus, such as a moving magnetic field, is not displayed. Without being able to view the flow of the solution, a user will not receive as much visual information about the properties of the magnetic field.

Another known apparatus for viewing the pattern of a magnetic field uses particles suspended within a solution that is contained within a handheld container. The particles within the solution are attracted to a magnetic field so that a user can view the pattern of the magnetic field. Again, the static pattern of the magnetic field is displayed by the magnetic particles, but the flow of the solution caused by the movement of the magnetic particles in response to a magnetic field cannot be displayed. Therefore, a user of the conventional apparatus views the pattern of the magnetic field, but cannot view the movement of the solution. The movement of the solution, which is caused primarily by the movement of the magnetic particles, permits a user to view the creation of the magnetic field pattern which permits the user to learn more about the magnetic field.

Thus, there is a need for an apparatus and method for displaying a pattern of a magnetic field which avoid these and other problems of known devices, and it is to this end that the present invention is directed.

SUMMARY OF THE INVENTION

The invention provides an apparatus and method for displaying static and dynamic patterns of magnetic fields wherein the static pattern of the magnetic field may be displayed and the dynamic pattern of the magnetic field as shown by a flow of a solution in response to the magnetic field may also be displayed. The display of the magnetic field pattern and flow of the solution help a person visualize the magnetic field. In addition, the particles within the solution may be easily dispersed by agitation so that the pattern of the magnetic field may be easily erased. In addition, the invention provides an apparatus for displaying the pattern of a magnetic field that may be used by a consumer within his home or at school.

The invention also provides an apparatus and method for displaying static and dynamic patterns of magnetic fields wherein a user may create artistic designs due to flow of the solution and the movement of the magnetic particles. In fact, the apparatus may stimulate a child or person to be more artistic because it is so easy to create new and unique patterns.

In accordance with the invention, an apparatus for displaying a pattern of a magnetic field is provided, comprising a container, a solution within said container having a plurality of magnetic particles, suspended within the solution, that align with a magnetic field in the vicinity of the container, the magnetic particles causing the solution to flow as the particles move into alignment with the magnetic field, and a plurality of flow indicator particles, suspended within the solution so that the flow of the solution in response to the movement of the magnetic particles is displayed. A method for displaying a pattern of a magnetic field and a mixture for use in an apparatus for displaying a pattern of a magnetic field are also disclosed.

DETAILED DESCRIPTION OF A PREFERRED EMBODIMENT

The invention is particularly applicable to an apparatus for viewing a pattern of a magnetic field of an object. It is in this context that the invention will be described. It will be appreciated, however, that the system and method in accordance with the invention has greater utility.

Figure 1:
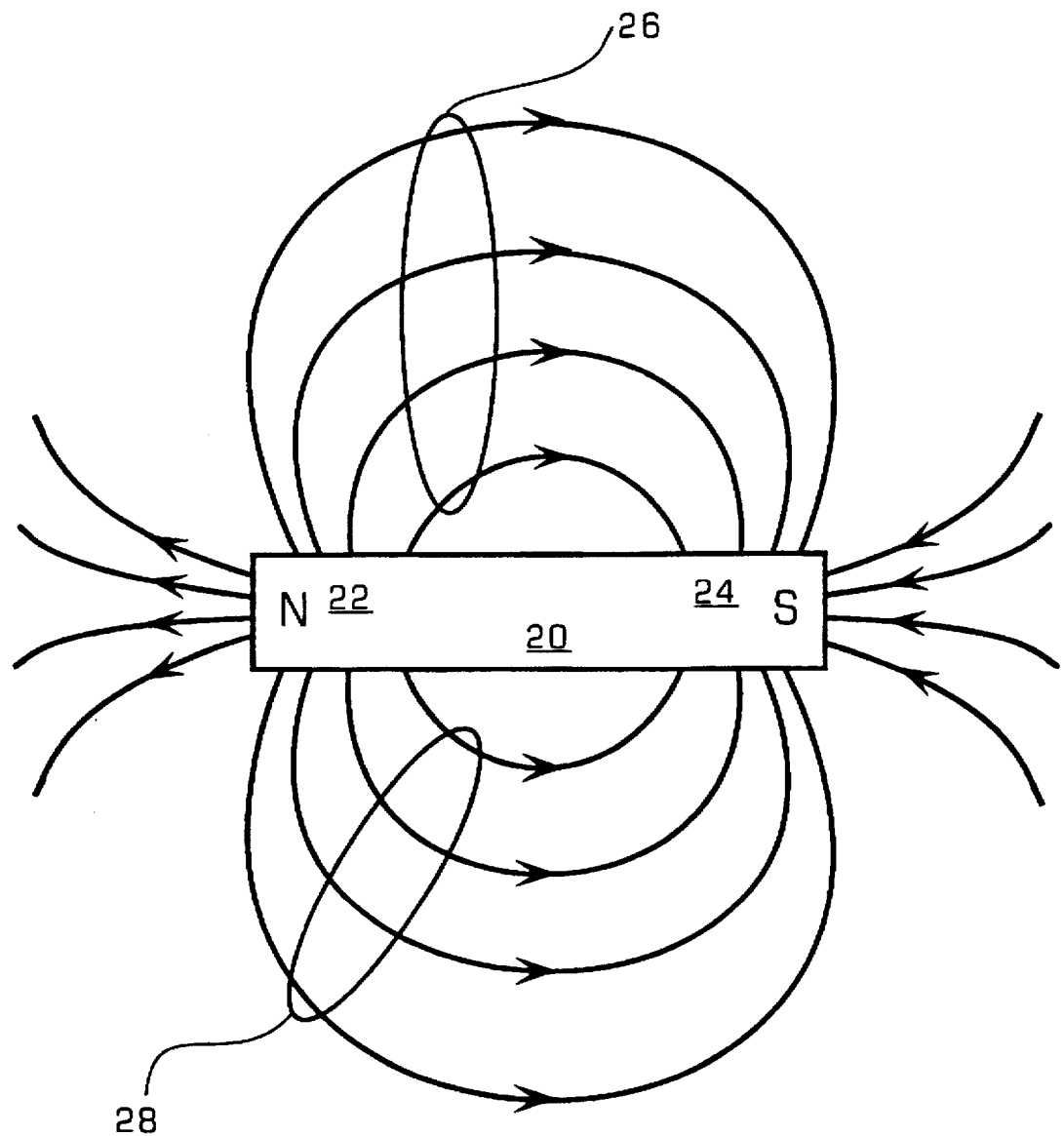
FIG. 1 is a diagrammatic view of the magnetic field of a bar magnet.

To better understand the invention, as example of a pattern of the magnetic field of a magnetic object, will be briefly described. FIG. 1 is a diagrammatic view of a magnetic object 20, such as a bar magnet. The magnetic object has a north pole 22 and a south pole 24. As shown, a plurality of magnetic field lines 26, 28 originate at the north pole and end at the south pole. As described below, the pattern of this and other magnetic fields may be displayed by the apparatus in accordance with the invention. The invention may be used to display the pattern of the magnetic field for any type of magnetic object. An apparatus for displaying both the static and dynamic patterns of magnetic fields in accordance with the invention will now be described.

Figure 2:
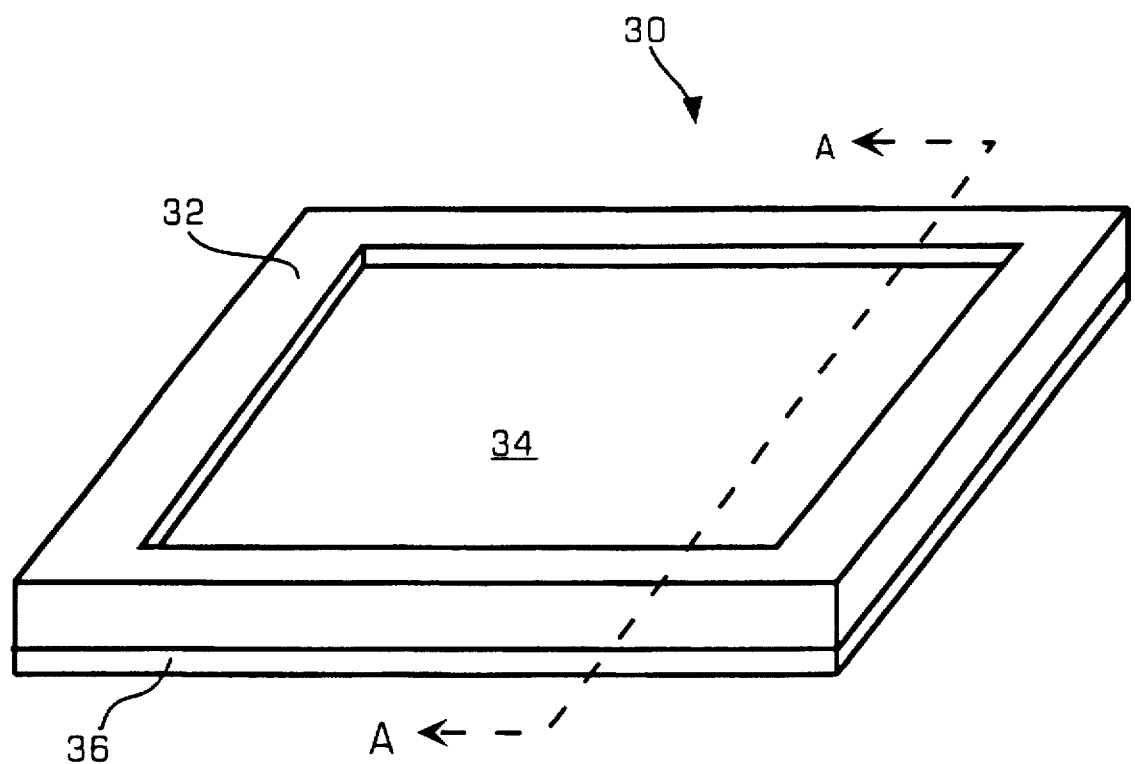
FIG. 2 is a perspective view of a magnetic field pattern displaying apparatus in accordance with the invention.
Figure 3:
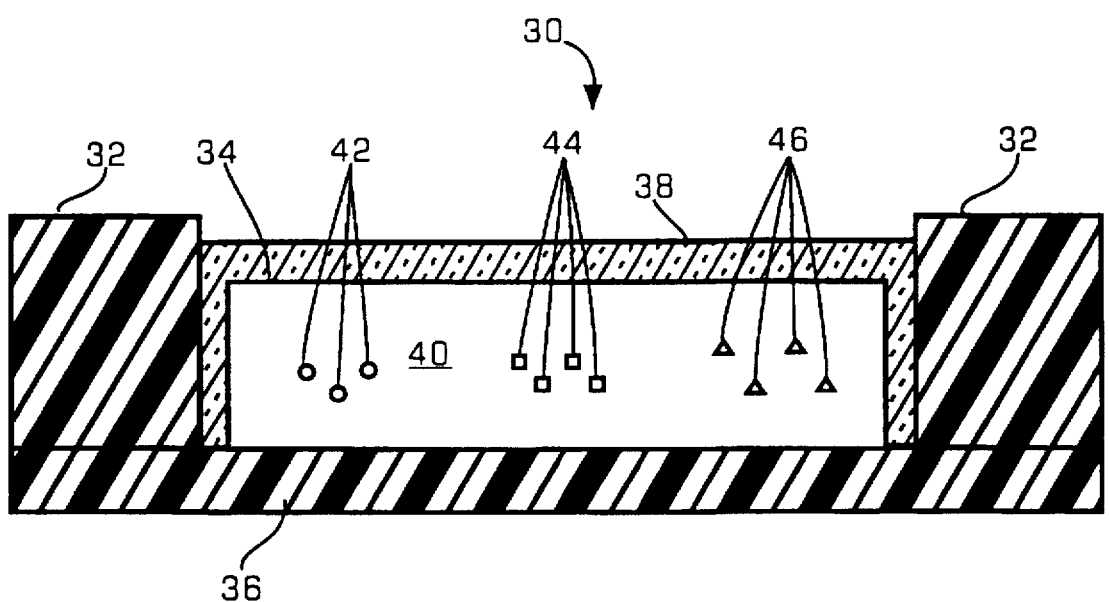
FIG. 3 is a sectional view of a magnetic field pattern displaying apparatus of FIG. 2 along sectional line A—A.

FIGS. 2 and 3 are a perspective view and a sectional view, respectively, of a magnetic field pattern displaying apparatus in accordance with the invention. As shown, the apparatus may comprise a container 30 that may have a frame 32, a planar transparent top cover 34 attached to the frame, and a planar back or bottom portion 36. As shown, the top cover may be slightly recessed from the upper part of the frame so that the top cover is not damaged or scratched if the apparatus is dropped. As shown in FIG. 3, the frame 32 and the top cover 34 are both attached to the back portion 36. The back portion is preferably a white color so that a pattern of a magnetic field may be more easily viewed by the user through the top cover, as described below in more detail. The container preferably is watertight and may contain a solution 40 that will be described in more detail below. The solution may have, in suspension, a plurality of magnetic field indicator particles 42, a plurality of flow indicator particles 44, and a plurality of colored particles 46. The solution may contain the magnetic field indicator particles, and either the flow indicator particles or the colored particles, or both the flow indicator and colored particles. The particles may be suspended within the solution, and may not be dissolved by the solution.

In operation, as a magnetic field is moved near the apparatus, the magnetic indicator particles align with the magnetic field lines of the magnetic field and move towards the magnetic field. The movement of the relatively large magnetic field indicator particles in the solution causes the solution to move and consequently cause the flow indicator particles and/or the colored particles to move with the flow of the solution. Thus, a user may see the static pattern of the magnetic field as well as the dynamic movement of the solution in response to the magnetic field, which shows the creation of the magnetic field pattern. The chemical composition of the solution, the magnetic particles, the flow indicator particles, and the colored particles will now be described.

The magnetic field indicator particles 42 may be a metal ferrite, such as zinc-magnesium-iron ferrite, and may be, for example, ferrite manufactured by Dexter Inc. as mesh number 325 and stock number 24B. The invention is not limited to the particular magnetic field indicator particles described above, but may be any particle with the following properties. The magnetic field indicator particles preferably have a high permeability as compared to iron so that the particles are easily attracted to the magnetic field. In addition, the particles should have a low residual field so that the particles may be easily dispersed by shaking the apparatus. The magnetic field indicator particles should also be relatively smooth particles so that the particles move easily relative to each other. Finally, the particles may be of approximately uniform large size (about 30 microns), but may also be of a smaller size because both the large and small particles affect the flow indicator particles to some extent. The particles should be able to be suspended in a solution and should not be dissolved by the solution. The magnetic field indicator particles show the pattern of a magnetic field near the apparatus, and are preferably sufficiently large in size so that movement of the magnetic field indicator particles cause the solution within the container to move as the particles align themselves with the field lines, which in turn causes flow patterns that may be displayed using the flow indicator particles, described below.

The flow indicator particles 44 may be particles, such as titanium dioxide coated onto mica particles, such as manufactured by Mearl Corporation as Mearlin Hi-Lite Gold Part number 9220C. The flow indicator particles may be any type of particles which exhibit the following desirable properties. The flow indicator particles are preferably rheoscopic, so that the appearance of the particles change depending on the orientation of the particle and the orientation of the particle may depend on the flow of the solution. The flow indicator particles should also be lustrous and radiant. Each individual flow indicator particles may not be easily seen, but the flow patterns of a number of flow indicator particles may be easily seen. The flow indicator particles should be able to be suspended in a liquid, should not be dissolved by the solution, and should not chemically react with the magnetic particles.

The solution may also contain some colored particles that may also show the flowlines of the solution. These colored particles may be glitter that further helps to display the flowlines by making them more visible and make the apparatus more interesting to view. These colored particles may be any type of particle that is small and light enough to show the bulk movement of the solution, and that is colorful or shiny. In contrast to the flow indicator particles, the individual colored particles may be easily seen by a user of the apparatus. The solution within the container in accordance with the invention may have magnetic indicator particles and only flow indicator particles, only colored particles, or both flow indicator and colored particles. Now, the operation of the apparatus in accordance with the invention will be described.

The solution may have a number of different components, in addition to the magnetic field indicator particles, the flow indicator particles and the colored particles described above. For example, the solution may have an anti-oxidation agent, such as ascorbic acid in a concentration of 200 mg per liter of solution or any other component that minimizes the chemical reaction of the magnetic indicator particles with the solution. The solution may also have a preservative, such as 1 gram of methyl paraben in 25 ml of isopropyl alcohol per liter of solution, or any other component that prevents bacteria or fungi from growing in the solution. The solution may also have a thickener, such as 125 ml of glycerol per liter of solution, or any other component that increases the viscosity of the solution and slows down the movement of the solution. The thickener permits a user to view the movement of the solution more easily because the solution does not move as quickly. In addition, the solution may also have an agent, such as 130 grams of sodium chloride per liter of solution, or any other component for preventing the colored particles from adhering to the container's inner surfaces. The solution is preferably non-toxic so that, in the event that the container breaks or is ruptured, the user is not poisoned by the solution.

Figure 4:
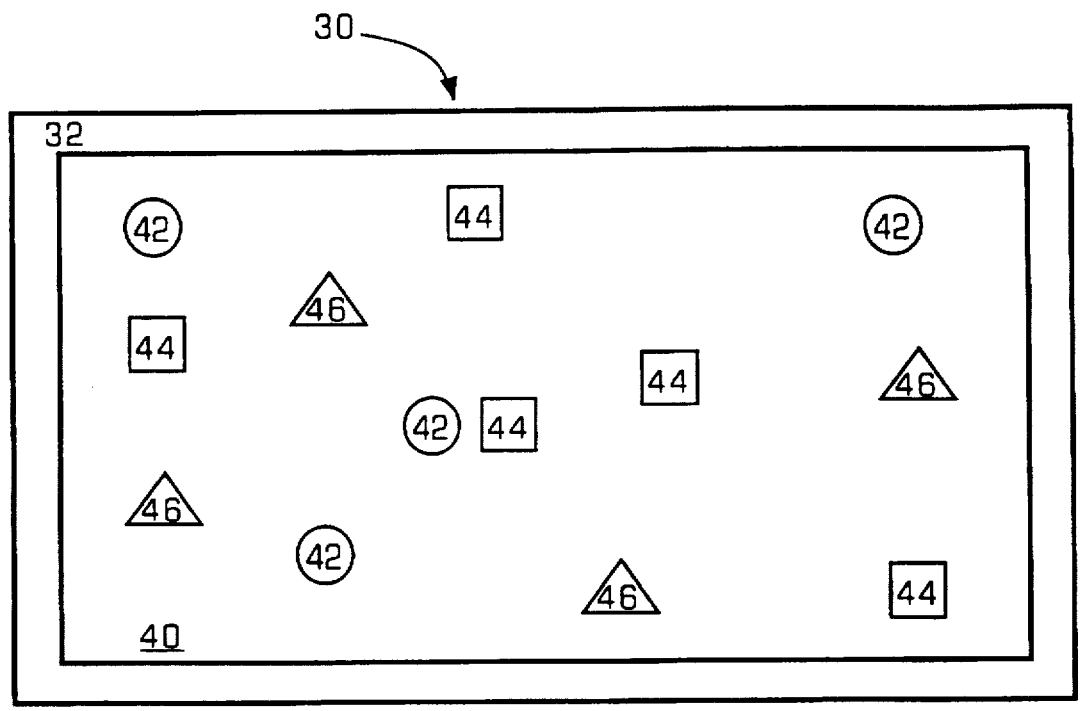
FIG. 4 is a top view of a magnetic field pattern displaying apparatus in accordance with the invention that has been reset and does not display a magnetic field pattern.

FIG. 4 is a top view of an apparatus for displaying magnetic field patterns when no magnetic field is near the apparatus or any previous magnetic field patterns have been erased by agitating the apparatus. As shown, the solution within the apparatus 30 may be viewed through the window in the container. Where there is no local magnetic field near the solution, the magnetic field indicator particles 42, the flow indicator particles 44 and the colored particles 46 will be scattered randomly throughout the solution. To erase a previous magnetic field pattern, the apparatus 30 may be agitated so that any patterns formed by the particles are broken up and the particles within the solution are again randomly distributed throughout the solution.

Figure 5:
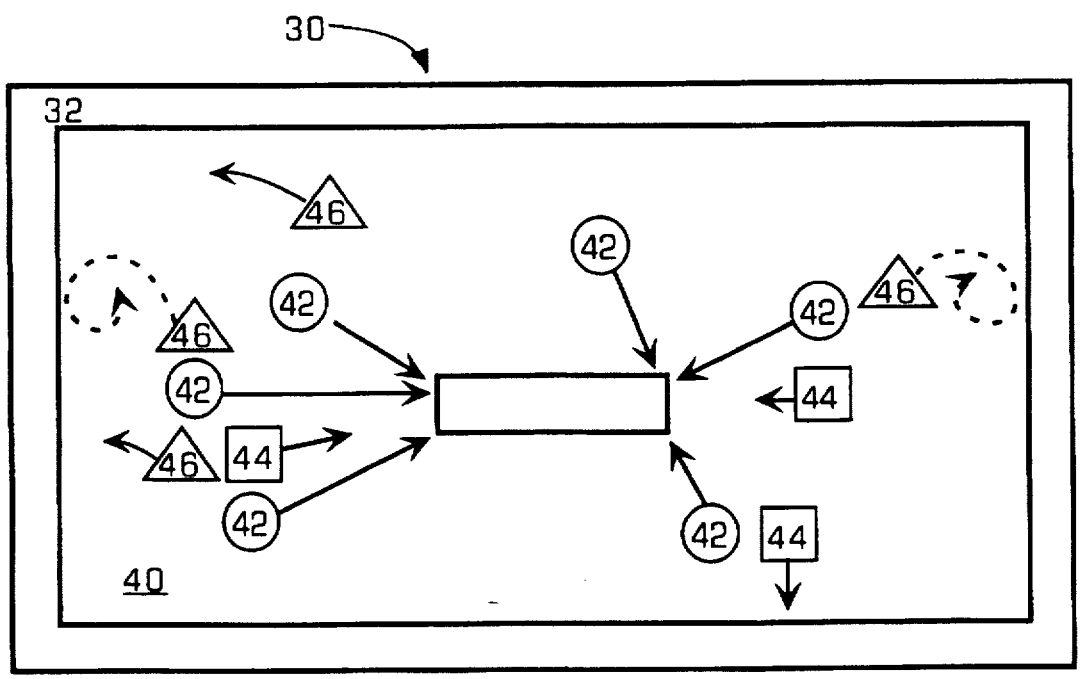
FIG. 5 is a top view of a magnetic field pattern displaying apparatus in accordance with the invention that has recently been moved near a magnetic field.

FIG. 5 is a top view of an apparatus for displaying magnetic field patterns when a magnetic field has recently been moved in close proximity to the solution. In this example, a bar magnet with a predetermined magnetic field as shown previously in FIG. 1, has been placed on top of the window of the container, or underneath the back portion. As shown, the magnetic field indicator particles 42 are attracted to the north and south poles of the magnet. In addition, the movement of the magnetic field indicator particles, which may be relatively large, towards the magnet may cause the solution to flow away from the magnet which causes most of the flow indicator particles 44 and the colored particles 46 to flow away from the magnet. Some of the flow indicator particles and colored particles, however, may move towards the magnetic field because the flow indicator and colored particles may be dragged by the magnetic field indicator particles towards the magnet due to the mass of the magnetic field indicator particles. In addition, the movement of the magnetic field indicator particles may cause eddies within the solution that may be displayed because the colored particles 46, for example, trace the path of these eddies. In addition, if the magnet is moved around relative to the solution such that a dynamic magnetic field pattern is formed, the flow indicator and/or the colored particles may show the dynamic magnetic field pattern that occurs. Thus, the static pattern of the magnetic field when the magnet is not moved, and the dynamic pattern of the magnetic field as the magnet is moved, as shown by the flow of the solution, may both be displayed.

Figure 6:
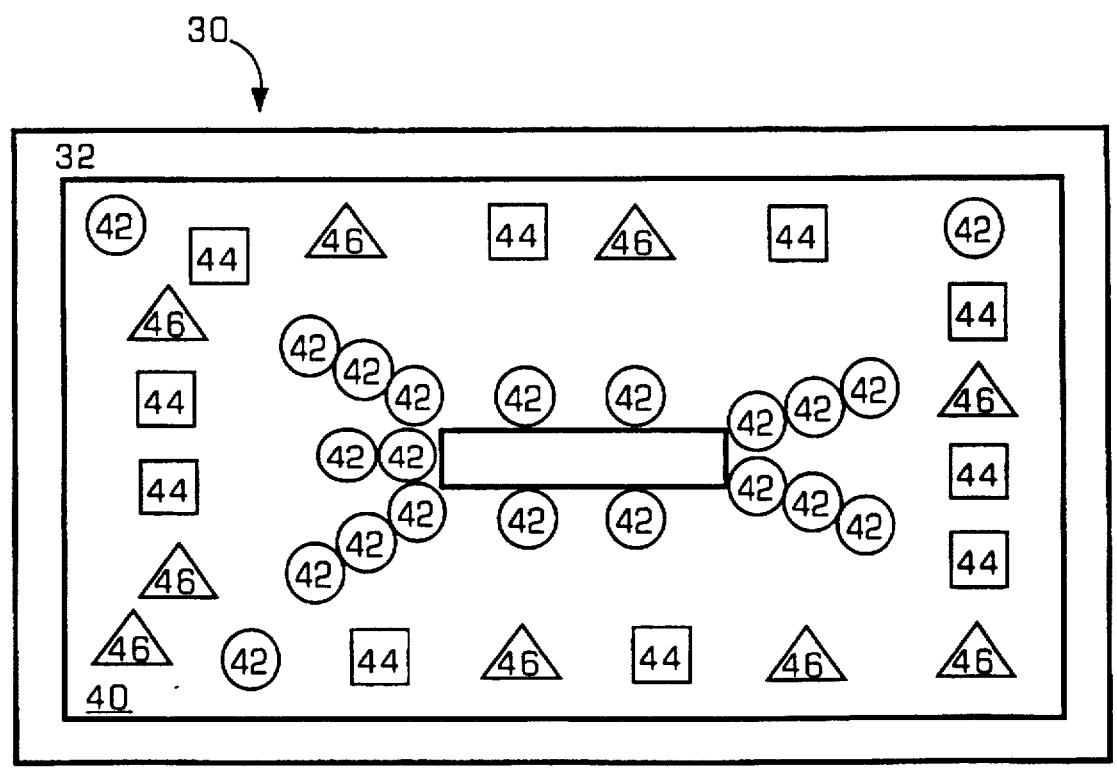
FIG. 6 is a top view of a magnetic field pattern displaying apparatus in accordance with the invention that has been moved near a magnetic field for a period of time.

FIG. 6 is a top view of an apparatus for displaying magnetic field patterns after a magnetic field has been in close proximity to the solution for a period of time so that there is a static or steady state magnetic field. As shown, because the magnetic field is static, the movement of the magnetic field indicator particles 42 has mostly stopped and a large number of the magnetic field indicator particles are located near the bar magnet. In addition, the flow indicator particles 44 and the colored particles 46 have also stopped moving. Due to the larger number of magnetic field indicator particles near the bar magnet, there is a space immediately around the bar magnet that may not have any magnetic field indicator particles. The higher concentrations of the magnetic field indicator particles near the poles of the magnet indicate that the magnetic field is strongest near the poles.

The magnetic field pattern display apparatus in accordance with the invention, permits a person to view the static magnetic field pattern created by different magnetic objects, such as different shape magnets or other magnetic objects, and may also view the dynamic magnetic field patterns as shown by the flow of the solution that occurs in response to a moving magnetic field. Therefore, a person using the magnetic field pattern display apparatus in accordance with the invention may see the otherwise invisible magnetic field patterns and the otherwise invisible flow patterns within the solution that occur due to a changing magnetic field.

While the foregoing has been with reference to a particular embodiment of the invention, it will be appreciated by those skilled in the art that changes in this embodiment may be made without departing from the principles and spirit of the invention, the scope of which is defined by the appended claims.

I claim:

1. An apparatus for displaying a flow of a solution in response to the movement of magnetic particles in the solution, comprising:

a container;

a solution within said container having a plurality of magnetic particles, freely suspended within the solution, that move through the solution and align with a magnetic field in the vicinity of the container, the movement of the magnetic particles causing the solution to flow as the magnetic particles move into alignment with the magnetic field; and a plurality of non-magnetic, visually observable flow indicator particles, freely suspended within the solution that move with the solution so that the flow of the solution in response to the movement of the magnetic particles is displayed by said flow indicator particles.

2. The apparatus of claim 1, further comprising a plurality of colored particles suspended within the solution, the colored particles moving with the solution so that the flow of the solution is displayed by the colored particles.

3. The apparatus of claim 2, wherein said colored particles comprise glitter.

4. The apparatus of claim 2, wherein the solution comprises means for increasing the viscosity of the solution so that the rate of movement of the solution is decreased.

5. The apparatus of claim 4, wherein said solution further comprises means for reducing the chemical reaction of the magnetic field indicator particles with the solution.

6. The apparatus of claim 2, wherein said magnetic field indicator particles comprise zinc-magnesium-iron ferrite particles.

7. The apparatus of claim 1, wherein said flow indicator particles comprise rheoscopic particles.

8. The apparatus of claim 7, wherein said flow indicator particles comprises titanium dioxide coated mica particles.

9. The apparatus of claim 7, wherein the container further comprises a back plate, having a predetermined color, attached to the container so that the magnetic field indicator particles, the flow indicator particles and the colored particles are easily viewed by a user of the apparatus.

10. A method for displaying a flow of a solution in response to the movement of magnetic particles in the solution using a container and a solution within the container, the method comprising:

aligning a plurality of magnetic particles, freely suspended within the solution, with a magnetic field in the vicinity of the container, the magnetic particles moving through the solution and causing the solution to flow as the magnetic particles move into alignment with the magnetic field; and causing a plurality of non-magnetic, visually observable flow indicator particles, freely suspended within the solution, to move with the solution so that the flow of the solution in response to the movement of the magnetic particles is displayed by said flow indicator particles.

11. The method of claim 10, further comprising causing a plurality of colored particles, suspended within the solution, to move so that the flow of the solution is displayed by the colored particles.

12. The method of claim 11 further comprising agitating the container to randomly distribute said magnetic field indicator particles, said flow indicator particles and said colored particles within the solution.

13. A mixture for use in an apparatus for displaying a flow of the mixture in response to the movement of magnetic particles in the mixture, the mixture comprising:

a solution;

a first plurality of particles having magnetic susceptibility freely suspended within the solution that move through the solution and align with the lines of the magnetic field and cause the solution to flow as the magnetic particles move into alignment with the magnetic field; and a second plurality of non-magnetic, visually observable flow indicator particles freely suspended within the solution that move with the solution so that the flow of the solution in response to the movement of the magnetic particles is displayed by said flow indicator particles.

14. The apparatus of claim 13, further comprising a plurality of colored particles, suspended within the solution so that the flow of the solution is displayed by the colored particles.

15. The apparatus of claim 13, wherein the solution comprises means for increasing the viscosity of the solution so that the rate of movement of the solution is decreased.

16. The apparatus of claim 15, wherein said solution further comprises means for reducing the chemical reaction of the magnetic field indicator particles with the solution.

17. The apparatus of claim 14, wherein said magnetic field indicator particles comprise zinc-magnesium-iron ferrite particles.

18. The apparatus of claim 17, wherein said flow indicator particles comprise titanium dioxide coated mica particles.

* * * * *